(12) United States Patent
Schallmoser et al.

(10) Patent No.: US 7,564,673 B2
(45) Date of Patent: Jul. 21, 2009

(54) CONTROL CIRCUIT FOR CONVERTERS

(75) Inventors: Oskar Schallmoser, Ottobrunn (DE); Wolfram Sowa, Munich (DE)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 309 days.

(21) Appl. No.: 10/589,671

(22) PCT Filed: Feb. 1, 2005

(86) PCT No.: PCT/DE2005/000155

§ 371 (c)(1),
(2), (4) Date: Aug. 16, 2006

(87) PCT Pub. No.: WO2005/084084

PCT Pub. Date: Sep. 9, 2005

(65) Prior Publication Data

US 2008/0151586 A1    Jun. 26, 2008

(30) Foreign Application Priority Data

Feb. 24, 2004    (DE) ................ 10 2004 008 908

(51) Int. Cl.
*H05F 3/00*    (2006.01)
(52) U.S. Cl. ........................................ 361/235; 307/44
(58) Field of Classification Search ................ 399/170; 361/235; 363/134, 97; 307/44
See application file for complete search history.

(56) References Cited

U.S. PATENT DOCUMENTS

| 4,714,978 | A | * | 12/1987 | Coleman ................ 361/235 |
| 5,097,182 | A | | 3/1992 | Kelly et al. |
| 5,914,569 | A | | 6/1999 | Bildgen et al. |
| 6,144,139 | A | | 11/2000 | Noma et al. |
| 6,229,720 | B1 | | 5/2001 | Noma et al. |

FOREIGN PATENT DOCUMENTS

| EP | 0 735 658 | 10/1996 |
| EP | 0 936 845 | 8/1999 |
| JP | 01-223789 | 9/1989 |
| JP | 08-275535 | 10/1996 |
| JP | 10-304555 | 11/1998 |
| JP | 2000-116141 | 4/2000 |

OTHER PUBLICATIONS

English translation of Japanese Office Action dated Feb. 13, 2009.

* cited by examiner

*Primary Examiner*—Shawn Riley

(57) ABSTRACT

A converter circuit, in particular having a class E converter, comprising a drive circuit for a switching transistor MOS1 having two series-connected components which operate as a function of the threshold value, in particular comparators K1, K1' and K2, K2'.

17 Claims, 1 Drawing Sheet

CONTROL CIRCUIT FOR CONVERTERS

TECHNICAL FIELD

This invention relates to a converter circuit, in particular to a class E converter. The invention also preferably relates to converter circuits for use in electronic ballasts for lamps.

PRIOR ART

Electronic ballasts for lamps having various converter designs are known per se. In addition, the class E converter design is generally known, but is not customary in ballasts for lamps.

DESCRIPTION OF THE INVENTION

The invention is based on the problem of specifying a converter circuit which is improved in terms of the drive circuit for a switching transistor.

The invention relates to a converter circuit having a switching transistor and a drive circuit for driving the switching transistor which is designed to switch the switching transistor in response to a voltage or current value, characterized in that the drive circuit has two series-connected threshold value components which respond to a respective input signal as a function of the threshold value with an output signal transition, in that an input of a first one of the threshold value components is connected up such that it can detect the voltage or current value, the output of the first threshold value component drives an input of the second threshold value component, and the output of the second threshold value component drives the control electrode of the switching transistor.

In addition, the invention also relates to a correspondingly equipped electronic ballast for light-emitting devices, in particular for lamps. Finally, the invention also has a method aspect and thus relates to a method for operating the converter circuit or the electronic ballast and the light-emitting device which is supplied with power by the ballast. No detailed distinction is drawn below between the apparatus and the method aspects of the invention, which means that the entire disclosure is to be understood to refer to both the apparatus and the method.

Preferred refinements are described in the dependent claims.

The drive circuit according to the invention is characterized by two series-connected components, which are referred to here as threshold value components. This means those electronic components which respond to an input signal as a function of the threshold value with a relatively abrupt output signal transition. Preferred examples of these threshold value components will be explained in more detail below.

The first threshold value component should be connected up such that it can detect the current or voltage value to which the drive circuit should respond. For example, an input of this first threshold value component may be connected directly to a tap at a measuring resistor. The output signal, which responds as a function of the threshold value, from this first threshold value component is fed in the series circuit to an input of the second threshold value component, whose output signal then serves to drive the switching transistor. The drive circuit preferably does not require any further threshold value components. This affords the advantage of it being possible to manage with a single integrated circuit without in the process having to use very specific and correspondingly expensive special types. In anticipation of an example of the threshold value component which is described in more detail below, it is, for example, unproblematic to use an IC in which two comparators are available as threshold value components.

However, not only is the series circuit comprising the two threshold value components relatively economical in terms of components, but also it adds up the propagation times of the signal through the two threshold value components, as a result of which a desired time delay for driving the switching transistor can be achieved. In addition, the output signal from the first threshold value component can still be influenced, for example clamped or, as described in more detail below, delayed, for example by a capacitor circuit, before it is input into the second threshold value component. This influencing, in particular the capacitive delay, may in this case take place as a function of the signal state, for example by a change in impedance of the output of the first threshold value component being induced or utilized. The second threshold value component in this case has the consequence that this signal influencing has no direct effect on the driving of the switching transistor, and there, for example owing to excessively slow switching operations, leads to unnecessary switching losses or undefined intermediate states.

The current or voltage value which is critical for the drive circuit is preferably a current or voltage value which is tapped off in the converter circuit itself, particularly preferably a value for the switching transistor itself. The exemplary embodiment shows a drive circuit which responds to the switching path current which is tapped off using a measuring resistor (shunt resistor).

The converter topology used is preferably a class E converter, as is familiar to those skilled in the art. However, it may also be a different converter topology having a switching transistor. Naturally, those converter topologies are preferred in which the switching transistor should or can be switched as a function of a current or voltage value and not simply at constant times.

In the context of this invention it is also preferable for a single-feedback system to be used. In other words, the path via the two threshold value components forms the single feedback connection between the switching transistor, whose current or voltage value is tapped off, and its control electrode. The additional complexity which would become necessary, for example, in the case of a design having an oscillator, whose switching times can be controlled externally, is thus no longer required, and, in particular, it is possible to manage with only two threshold value components. For explanatory purposes, reference is also made to the exemplary embodiments.

One preferred variant of the threshold value component mentioned is a differential amplifier, to be precise preferably a comparator, i.e. a differential amplifier having precisely two discrete output states. Also conceivable, although less preferable, are, however, operational amplifiers. Finally, the term "threshold value component" is to be understood to include, for example, even Schmitt triggers, which are no longer actually categorized as differential amplifiers. Schmitt triggers have a hysteresis-like behavior, i.e. depending on the direction of the signal change have two different threshold values.

It has already been mentioned that the invention affords the advantageous possibility of influencing the signal between the two threshold value components. In this case, a delay circuit in particular comes into consideration which, in the case of one of two switching states of the switching transistor, delays the further propagation of the signal representative thereof and, in the other case, allows the signal to pass substantially undelayed. One preferred and simple embodiment has a capacitor and makes use of changes in the impedance of the output of the first threshold value component. These changes in impedance result in short or longer charge-reversal times of the capacitor and thus in the desired delay as a function of the signal state.

The changes in impedance may be induced, in the case of a push-pull output of the first threshold value component, for example of the first comparator, by a rectifier diode. This rectifier diode should be biased such that it is off in the desired signal state and thus produces a high impedance and makes possible correspondingly slow charge-reversal of the capacitor, preferably through another switching path and not through the diode in the off state. In the on state, however, the push-pull output can reverse the charge of the capacitor relatively rapidly.

A rectifier diode is no longer necessary, however, in the case of open-collector or open-drain outputs which have a relatively high output impedance in one output signal state (precisely in the so-called open output signal state) and in the other state essentially form a low-resistance short circuit to a reference potential.

If, in combination with a delay of the signal states between the two threshold value components, a comparator is selected at least for the second threshold value component, it is also possible for the time delay to be adjusted in a particularly simple way if the reference value can be adjusted which is used for the comparator.

The output of the second threshold value component need not necessarily be connected directly to the drive electrode of the switching transistor. In this case, conventional driver circuits may of course also be used in order to form a drive signal, which is matched to the possibly larger switching transistor of the converter, from the output signal from the second threshold value component.

The converter circuit according to the invention is preferably used in electronic ballasts, to be precise in particular in those for so-called dielectrically impeded discharges. This type of lamp has drawn increasing attention to itself in recent years, to be precise for, inter alia, linear lamps in the office automation sector or for flat lamps for back-lighting display panels, monitors etc. It is assumed that the nature of dielectric barrier discharge lamps is known. However, briefly, they are characterized by the fact that at least some of the electrodes are dielectrically isolated from the discharge medium, i.e. no direct current is conducted but merely displacement currents come about in the lamp. In particular in the case of specific, pulsed operating methods for which the class E converter design has proved to be advantageous, considerable degrees of efficiency and further technical advantages can be achieved with such lamps.

The invention will be explained in more detail below with reference to two exemplary embodiments, it being possible for the individual features to also be essential to the invention in other combinations.

PREFERRED EMBODIMENT OF THE INVENTION

Figure 1:
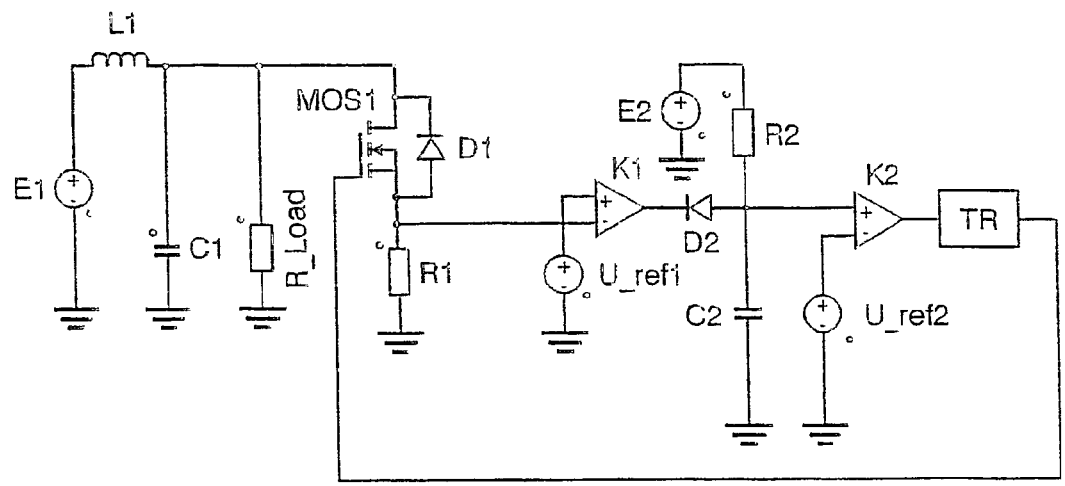
FIG. 1 shows a schematic circuit diagram of a first exemplary embodiment of a converter circuit according to the invention.

FIG. 1 shows a class E converter comprising the voltage source E1, the coil L1 and the capacitor C1 with a load R_Load, illustrated symbolically, and the switching transistor MOS1. For reasons of clarity, a freewheeling diode D1, which is in the present case represented by the body diode of the switching transistor MOS1 (implemented as a MOSFET), is connected in parallel with the switching transistor.

The coil L1 is representative of a transformer, whose secondary winding supplies power to a dielectric barrier lamp in the form of a large-area radiator for monitor back-lighting. This dielectric barrier lamp acts essentially capacitively, in very simple terms, and can thus replace the capacitor C1. During the discharge phases, the dielectric barrier lamp continues to act as an impedance capable of conducting an alternating current, and thus also as a load. The load R_Load is thus in this case only illustrated symbolically in order to represent dissipation of energy.

When the switching transistor MOS1 is on, the corresponding current charges the coil L1, the capacitor C1 and the load resistor R_Load remaining essentially free of voltage. When the switching transistor MOS1 is now opened, an induced voltage pulse is generated which actually leads to the discharge in the lamp being ignited and its operation being continued, but, in the case of the circuit diagram which is simplified here, initially triggers only one LC oscillation, which is damped by the load resistor R_Load, of the resonant circuit comprising the coil L1 and the capacitor C1. This LC oscillation should run for at least one half-cycle in the case of a class E converter and is then, possibly in the region of an inverse current, ended by the switching transistor MOS1 being switched on again.

In principle, class E converters can be driven in different ways, for example by the switching transistor (in this case MOS1) being switched off once a specified threshold value has been reached and switched on again once another, second threshold value of possibly another magnitude has been reached. Alternatively, the control may also take place, however, by the switching transistor being switched off once a specific time has elapsed and switched on again once another specific time has elapsed. In the context of this invention, however, a third variant is of particular interest, that is to say one in which the switching transistor MOS1, as in these exemplary embodiments, is switched off when a specified threshold value is reached and is switched on again once a specific time has elapsed.

However, further details will not be given here on the operation of the class E converter and the operation of the lamp. The invention is instead concerned with driving the switching transistor MOS1 in response to the switching transistor current. A drive circuit taps off this switching transistor current via a shunt resistor R1 and feeds it to the inverting input of a first comparator K1 where the corresponding voltage value is subtracted from a reference voltage value U_ref1, and, as a function of the sign of the difference, an output signal is generated. In this exemplary embodiment, the output is a push-pull output which has a rectifier diode D2 connected downstream of it. The rectifier diode D2 thus blocks a positive output signal and allows a negative output signal to pass. A negative output signal means, in terms of circuitry, the internal reference potential. The reference potential corresponds to the ground symbol in the figures and should not be confused with the reference voltages at the inputs of the comparators.

The negative output value which is allowed to pass is passed to the non-inverting input of a second comparator K2 where a further reference voltage U_ref2 is subtracted from this signal, and, as a function of the sign of the difference, again a positive output signal or an output signal which corresponds to the internal reference potential is generated using a push-pull output.

This output signal is passed to the gate of the switching transistor MOS1 (a power MOSFET) via an optional driver stage TR. If the switching transistor current thus reaches a threshold value, the output signal from the first comparator K1 becomes the reference potential (logic zero) and, without any substantial time delay, the output signal from the second comparator K2 likewise becomes the reference potential such that the driver stage TR of the switching transistor MOS1 switches off.

Thereupon, the transistor current naturally suddenly falls off, which leads to a positive output signal from the first comparator K1 and thus to reverse-biasing of the diode D2. A voltage source E2 which has not been mentioned so far thereupon charges a capacitor C2, which is connected by its positive terminal to the signal path between the output of the first comparator K1 and the input of the second comparator K2, via a pull-up resistor R2. The time constant formed in accordance with R2 and C2 is required in order to increase the input value at the non-inverting input of the second comparator K2 to such an extent that the output signal from the second comparator K2 changes and in turn leads to the switching transistor MOS1 being driven, i.e. being switched on.

By adjusting the reference value U_ref2, the time constant can be adjusted in a simple and direct manner.

In addition to the time constant formed by the resistor R2 and the capacitor C2, however, there are also the propagation times through the two comparators K1 and K2.

The switching transistor MOS1 thus remains switched off for a corresponding time which corresponds to the oscillation time of the class E converter.

Conversely, the discharge process for the capacitor C2 by means of the diode D2 and the push-pull output of the comparator K1 is relatively rapid, in any case more rapid than the sum of the delay times of the two comparators K1 and K2 and the switch S1.

Figure 2:
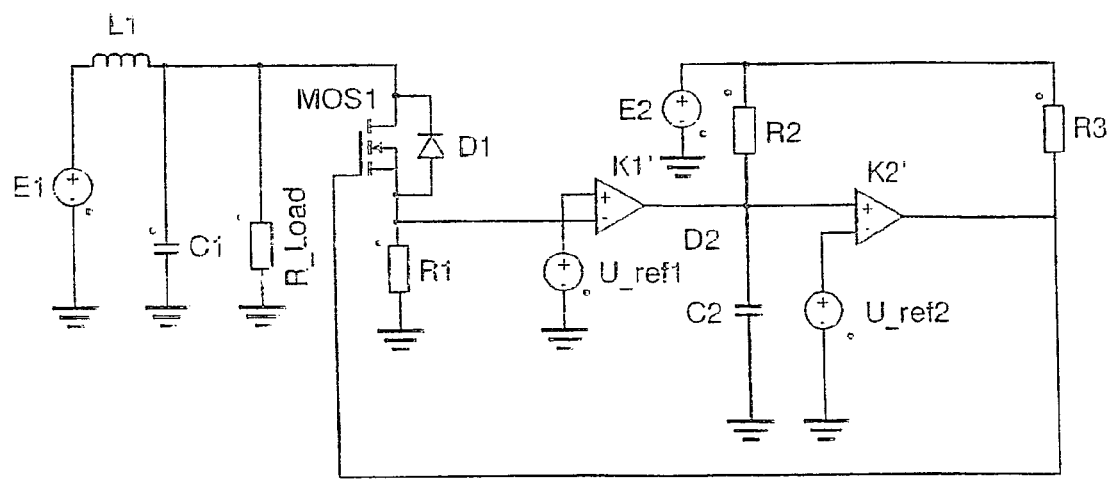
FIG. 2 shows a schematic circuit diagram of a second exemplary embodiment of a converter circuit according to the invention.

The second exemplary embodiment in FIG. 2 largely corresponds to the first exemplary embodiment shown in FIG. 1 and is to this extent also not described in any more detail. The differences consist in the fact that the comparators K1' and K2' each have an open-collector (or open-drain) output, and thus initially there is no need for the diode D2. That is to say the open-collector output forms, in the case corresponding to a logic zero (negative output signal), a low-resistance short circuit to the reference potential and has, in the other case of a logic one, i.e. in the case of a positive output signal, a high resistance. In this case, the capacitor is thus charged by the voltage source E2 and the pull-up resistor R2.

In the case of the high-resistance output state of the second comparator K2', however, in this exemplary embodiment a corresponding, positive potential is likewise generated via a pull-up resistor R3 and the voltage source E2 mentioned.

The invention claimed is:

1. A converter circuit comprising:
a switching transistor; and
a drive circuit for driving the switching transistor which is designed to switch the switching transistor in response to a voltage or current value, wherein the drive circuit comprises two series-connected threshold value components which respond to a respective input signal as a function of a threshold value with an output signal transition, in that an input of a first threshold value component is connected such that it can detect the voltage or current value from the output of the switching transistor, and the output of the first threshold value component drives an input of a second threshold value component, and the output of the second threshold value component drives the control electrode of the switching transistor; and
wherein the converter circuit comprises a single-feedback circuit via the threshold value components.

2. The converter circuit of claim 1, wherein the drive circuit is designed to respond to a voltage or current value in the converter circuit.

3. The converter circuit of claim 2, wherein the drive circuit is designed to respond to a voltage or current value of the switching transistor.

4. The converter circuit of claim 3, wherein the converter is a class E converter.

5. The converter circuit of claim 1, wherein at least one of the threshold value components is a differential amplifier.

6. The converter circuit of claim 5, wherein the differential amplifier(s) is/are (a) comparator(s).

7. The converter circuit of claim 1, wherein the converter circuit further comprises a delay circuit between the output of the first threshold value component and the input of the second threshold value component, said delay circuit passing on output signals representing a first switching state of the switching transistor from the output of the first threshold value component to the input of the second threshold value component once a fixed time has elapsed, while allowing output signals representing the other, second switching state to pass with less of a time delay.

8. The converter circuit of claim 7, wherein the delay circuit comprises a capacitor, wherein the output of the first threshold value component is connected to the capacitor at a high impedance when there is a transition from an output signal representing the second switching state to an output signal representing the first switching state and is connected to the capacitor at a lower impedance when there is a transition from an output signal representing the first switching state to an output signal representing the second switching state.

9. The converter circuit of claim 8, wherein the first threshold value component has a push-pull output, and the high impedance is generated by a rectifier diode which is off between the output of the first threshold value component and the capacitor.

10. The converter circuit of claim 8, wherein the first threshold value component has an open-collector or open-drain output.

11. The converter circuit of claim 8, wherein the second threshold value component is a comparator, and a reference value of the comparator can be adjusted in order to be able to vary the fixed time for passing on the output signal representing the first switching state of the switching transistor.

12. The converter circuit of claim 1, further comprising a driver stage provided between the output of the second threshold value component and the control electrode of the switching transistor.

13. The converter circuit of claim 1, wherein the converter circuit is a circuit within an electronic ballast for a light-emitting device.

14. The converter circuit of claim 13, wherein the converter circuit within the electronic ballast supply supplies power to a dielectric baffler discharge lamp.

15. A method for operating a converter circuit comprising:
applying a current or voltage to an input of a first threshold value component of said converter circuit, said first threshold value component having a threshold value;
outputting a first signal from the first threshold value component, said first signal corresponding to a value of the current or voltage applied to the first threshold value component as a function of the threshold value;

applying the first signal to an input of a second threshold value component of said converter circuit, said second threshold value component having the threshold value and leading to a control electrode driving a switching transistor;

outputting a second signal from the second threshold value component to the control electrode driving the switching transistor, said second signal corresponding to the first signal from the first threshold value component as a function of the threshold value.

16. The method of claim 15, wherein said converter circuit is a circuit within an electronic ballast for operating a light-emitting device.

17. An illumination system comprising:

a lamp;

an electronic ballast for the lamp, said electronic ballast including a converter circuit comprising:

a switching transistor; and a drive circuit for driving the switching transistor which is designed to switch the switching transistor in response to a voltage or current value, wherein the drive circuit comprises two series-connected threshold value components which respond to a respective input signal as a function of the threshold value with an output signal transition, in that an input of a first threshold value component is connected such that it can detect the voltage or current value from the output of the switching transistor, and the output of the first threshold value component drives an input of a second threshold value component, and the output of the second threshold value component drives a control electrode of the switching transistor.

* * * * *